July 22, 1952  W. A. VAN BERKEL  2,604,314
CONTROL DEVICE FOR THE RECORDING MECHANISM OF WEIGHING APPARATUS
Filed Aug. 5, 1947  2 SHEETS—SHEET 1
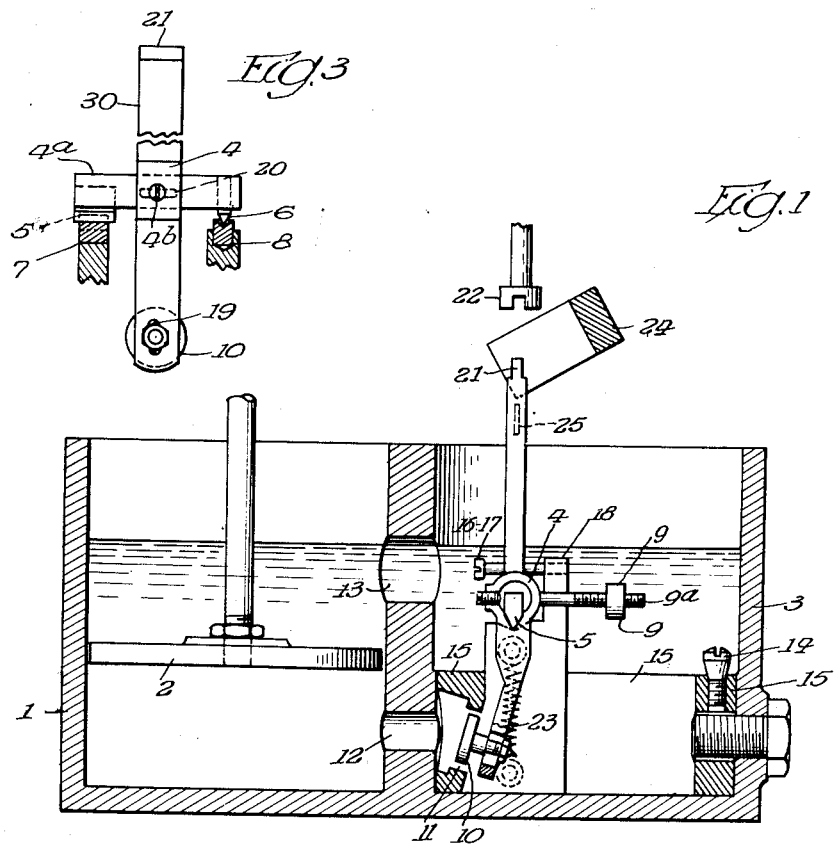
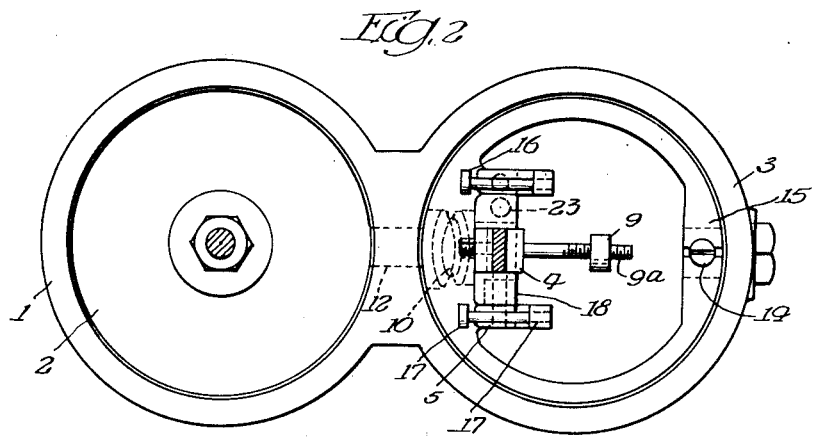
Inventor
Wilhelmus Adrianus Van Berkel
By Spencer, Marzall, Johnston & Cook
Attys.

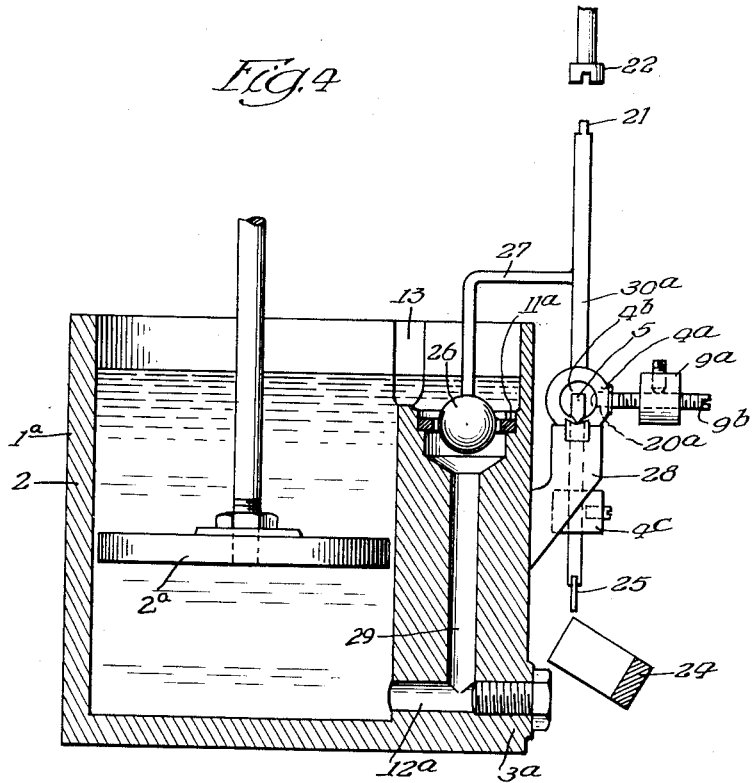
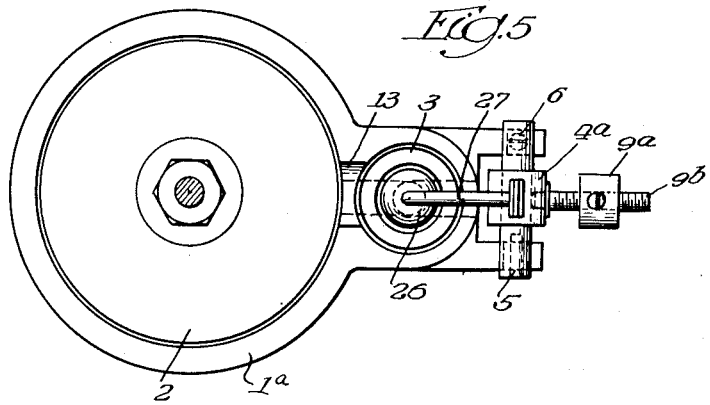

Patented July 22, 1952

2,604,314

UNITED STATES PATENT OFFICE 2,604,314

CONTROL DEVICE FOR THE RECORDING MECHANISM OF WEIGHING APPARATUS

Wilhelmus A. van Berkel, Clarens Montreaux, Switzerland, assignor to U. S. Slicing Machine Company, Inc., a corporation of Indiana Application August 5, 1947, Serial No. 766,358
In the Netherlands November 6, 1943

Section 1, Public Law 690, August 8, 1946
Patent expires November 6, 1963

10 Claims. (Cl. 265—5)

This invention relates to a control device for the recording mechanism of weighing apparatus, said device being of the type which prevents operation of the recording mechanism during weighing movement of the weighing apparatus, and which provides for operation of the recording mechanism when the weighing apparatus attains equilibrium.

An object of the invention is to provide a highly sensitive control device wherein friction is reduced to a minimum, and which effectively prevents operation of the recording mechanism on slightest weighing movement of the weighing apparatus.

According to the present invention, a control device of the aforesaid type comprises a fluid discharge passage, a body associated with said passage and adapted to move to and fro relative thereto and clear of the walls thereof, and pendulum means carrying said body, or integral therewith, and adapted to allow said to-and-fro movement independently of the movement of the weighing mechanism, the arrangement being such that during weighing movement of the weighing apparatus fluid is discharged to displace the pendulum means from its operative position in which the recording mechanism is operated, and on the weighing apparatus attaining equilibrium the pendulum means returns to operative position.

Embodiments of the invention will now be described by way of example with reference to the accompanying drawings, in which Fig. 1 is a sectional elevation of one form of control device.

Fig. 2 is a plan view of Fig. 1.

Fig. 3 is a sectional detail view.

Fig. 4 is a sectional elevation of another form of control device.

Fig. 5 is a plan view of Fig. 4.

Referring to Figs. 1 to 3 of the drawings:

The pendulum means of the device consists of a pendulum 4, mounted at 5 and 6 for pivotal movement from and towards the position shown in Fig. 1, and a vertical abutment arm 30 fixed on the pendulum and terminating at its outer end in a rectangular projection 21, adapted to engage in a corresponding rectangular slot in a vertically reciprocating part 22 of the recording mechanism (not shown). A disc-shaped body 10 mounted upon the pendulum 4 at the free end thereof, is located in a fluid discharge passage 11, and is adapted to move to and fro relative to, and clear of the walls of, the passage 11. In Fig. 1, the pendulum means is shown in the operative position, that is, the position in which the projection 21 on the abutment arm 30 registers with the slot in the part 22 of the recording mechanism, so that the part 22 may be moved until the projection 21 strikes the end of the slot, that is, to the extent necessary for operation of the recording mechanism.

Fluid discharge means for discharging fluid against the disc 10 and through the passage 11, consists of two interconnected cylinders 1 and 3, filled with a suitable liquid, for example oil, and in intercommunication through passages 12 and 13; and a piston 2 movable in the cylinder 1 and connected to the weighing apparatus (not shown), the pendulum mechanism being located in the cylinder 3. Thus, when the piston 2 moves downward during weighing movement of the weighing apparatus, liquid is discharged from the cylinder 1 to the cylinder 3 through the passages 12, 11, and against the disc 10. The passage 11 is the small-diameter end of a stepped cylindrical passage which extends through a resilient split ring 15 seated in the bottom of the cylinder 3, and registers with the passage 12. The split ring 15 is clamped at the bottom of the cylinder 3 by an expanding screw 14.

The body 10 located in the passage 11, is spaced from the walls of the passage, as shown, so as to be freely movable to and fro in the passage without frictional contact with the walls of the passage.

The body 10 is adjustably mounted on the pendulum 4, the mounting consisting of a stud on the body, a longitudinal slot 19 in the pendulum, the stud extending through the slot, and a clamping nut on the stud; also, the pendulum 4 is adjustable laterally on a cylindrical carrier 4a, and is locked in adjusted position by a pinching screw 4b which engages in a groove 20 in the carrier. Thus, by appropriate adjustment of the body 10 and the pendulum 4, the body is centrally located in the passage 11, clear of the walls of the passage.

The pendulum 4 is mounted on a pair of opposed bearings carried by supports 18, integral with the split ring 15. One of the bearings consists of a V-block 7, in which rests a knife edge 5 on the carrier 4a, and the other bearing consists of a block 8 formed with a conical recess, in which rests the point of a conical pin 6 on the carrier 4a, the point bearing thus formed preventing lateral shifting of the pendulum in the direction of its pivotal axis. Screws 16 and 17 on the supports 18 extend over the top of the carrier and prevent upward movement of the knife edge 5, and pin 6, from their bearings.

The pendulum 4 is balanced by a weight 9, adjustable by screwing the weight along an arm 9a.

A spring 23 is pivotally connected at its upper end to the pendulum 4, and is connected at its lower end to the split ring 15, said spring maintaining the pendulum in operative position in the event that the weighing apparatus is not level.

Alternatively, the same effect is obtained by a permanent magnet 24 which co-operates with a projection 25 on the abutment arm 30, the magnetic force being such that the pendulum, while being maintained in operative position, is free to move under the action of the liquid.

Instead of a liquid such as oil, air may be used as the actuating medium for the pendulum.

During weighing movement of the weighing apparatus, liquid from the cylinder 1 flows against the body 10 and causes pivotal movement of the pendulum 4 with its abutment arm 30 which is displaced to a position in which the projection 21 is out of register with the slot in the part 22. Thus, downward movement of the part 22 to the extent necessary for operation of the recording mechanism is prevented by the part 22 striking the projection 21. When the weighing apparatus attains equilibrium, the flow of liquid stops and the pendulum returns to operative position in which the projection 21 registers with the slot in the part 22, and recording can take place. The recording mechanism may be of the kind giving a printed record of the weight.

In the modified form shown in Figs. 4 and 5, a small cylinder 3a is provided on the cylinder 1a. The passage 12a opening from the bottom of the cylinder 1a communicates with the cylinder 3a through a vertical passage 29, and through a fluid discharge passage 11a defined by a ring, as shown. The passage 11a is the outlet end of a stepped cylindrical passage which forms a continuation of the passage 29. The pendulum 4a is mounted on brackets 28 projecting from the cylinder 3a, and has an adjustable weight 4c. The body in the passage 11a consists of a ball 26 mounted at the end of an arm 27 which is cranked at right angles and fixed to the abutment arm 30a. The ball 26 is spaced from the walls of the passage 11a, so as to be freely movable to and fro in the passage without frictional contact with the walls of the passage. By virtue of the provision of the relatively narrow passage 29, there is increased liquid pressure on the under side of the ball on downward movement of the piston 2a.

The pendulum 4a is balanced by a weight 9a, adjustable by sliding the weight along the arm 9b. Also, the arm 9b is screwed into the pendulum 4a and engages a lateral groove 20a in the carrier of the pendulum 4a. Thus the pendulum 4a can be laterally adjusted on the carrier 4b, the arm 9b serving as a pinching screw. The lateral adjustment enables central location of the ball 26 in the passage 11a.

The permanent magnet 24 co-operates with a projection 25 at the free end of the pendulum 4a.

Operation of this modified form of device is as described with reference to Figs. 1 to 3.

It will be clear that the invention provides for a simple and effective device which is of high sensitivity, and in which friction is reduced to a minimum.

While the preferred forms of the invention have been herein shown and described, it is to be understood that various changes may be made in the details of construction, and in the combination and arrangement of the several parts, within the scope of the claims, without departing from the spirit of this invention.

What is claimed as new is:

1. A control device for the recording mechanism of weighing apparatus, said device embodying a fluid discharge passage, a body associated with said passage and movable to and fro relative thereto and clear of the walls thereof, pendulum means carrying said body, means mounting said pendulum means to allow said to-and-fro movement, said pendulum means being unconnected with the weighing mechanism, and means actuated in response to the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium.

2. A control device for the recording mechanism of weighing apparatus, said device embodying a fluid discharge passage, a body associated with said passage and movable to and fro relative thereto and clear of the walls thereof, pendulum means carrying said body, means mounting said pendulum means to allow said to-and-fro movement, said pendulum means being unconnected with the weighing mechanism, and means actuated in response to the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium, the fluid discharge means embodying a fluid-containing cylinder, and a piston operable in the cylinder and connected to the weighing apparatus, fluid in the cylinder being discharged through the passage by the piston.

3. A control device for the recording mechanism of weighing apparatus, said device embodying a fluid discharge passage, a body associated with said passage and movable to and fro relative thereto and clear of the walls thereof, pendulum means carrying said body, means mounting said pendulum means to allow said to-and-fro movement, said pendulum means being unconnected with the weighing mechanism, means actuated in response to the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium, and means for mounting said pendulum, the last said means embodying a pair of opposed bearings, one of which is a knife-edge bearing and the other of which is a point bearing adapted to prevent lateral shifting of the pendulum means in the direction of its pivotal axis.

4. A control device for the recording mechanism of weighing apparatus, said device embodying a fluid discharge passage, a body associated with said passage and movable to and fro relative thereto and clear of the walls thereof, pendulum means carrying said body, means mounting said pendulum means to allow said to-and-fro movement, said pendulum means being unconnected with the weighing mechanism, and means actuated in response to the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium, the means which prevents operation of the recording mechanism on displacement of the pendulum means, and adapted to permit operation of the recording mechanism when the pendulum means returns, embodying an abutment on the pendulum means, movable into and out of the path of movement of a portion of the recording mechanism.

5. A control device for the recording mechanism of weighing apparatus, said device embodying a fluid discharge passage, a body associated with said passage and movable to and fro relative thereto and clear of the walls thereof, pendulum means carrying said body, means mounting said pendulum means to allow said to-and-fro movement, said pendulum means being unconnected with the weighing mechanism, means actuated in response to the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium, and means operative to exert a force on said pendulum means for maintaining the pendulum means in operative position in the event that the weighing apparatus is not level.

6. A control device for the recording mechanism of weighing apparatus, said device embodying a fluid discharge passage, a body associated with said passage and movable to and fro relative thereto and clear of the walls thereof, pendulum means carrying said body, means mounting said pendulum means to allow said to-and-fro movement, said pendulum means being unconnected with the weighing mechanism, means actuated in response to the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium, and magnetic means operative to exert a force on said pendulum means for maintaining the pendulum means in operative position in the event that the weighing apparatus is not level.

7. A control device for the recording mechanism of weighing apparatus, said device embodying a pair of chambers having communication with each other and containing a fluid, pendulum means in one of the chambers, said pendulum means embodying an abutment surface, said pendulum means and said surface being movable to and fro in the pendulum containing chamber by the action of the fluid, a piston in the other chamber operative by the actuation of the weighing mechanism to force the fluid from the piston chamber to the pendulum chamber to swing the pendulum, and means connected to the pendulum means movable by the swinging movement of the pendulum, into and out of the path of movement of a portion of the recording mechanism, to control the operation of the latter.

8. A control device for the recording mechanism of weighing apparatus, said device embodying a pair of chambers having communication with each other and containing a fluid, pendulum means in one of the chambers, said pendulum means embodying an abutment surface, said pendulum means and said surface being movable to and fro in the pendulum containing chamber by the action of the fluid, a piston in the other chamber operative by the actuation of the weighing mechanism to force the fluid from the piston chamber to the pendulum chamber to swing the pendulum, means connected to the pendulum means movable by the swinging movement of the pendulum, into and out of the path of movement of a portion of the recording mechanism, to control the operation of the latter, and means operative to exert a force on said pendulum means for maintaining the pendulum means in operative position in the event that the weighing apparatus is not level.

9. A control device for the recording mechanism of weighing apparatus, said device embodying a pair of chambers having communication with each other and containing a fluid, pendulum means in one of the chambers, said pendulum means embodying an abutment surface, said pendulum means and said surface being movable to and fro in the pendulum containing chamber by the action of the fluid, a piston in the other chamber operative by the actuation of the weighing mechanism to force the fluid from the piston chamber to the pendulum chamber to swing the pendulum, means connected to the pendulum means movable by the swinging movement of the pendulum, into and out of the path of movement of a portion of the recording mechanism, to control the operation of the latter, and a removable support for said pendulum means including, a split anchoring ring, means for expanding said ring, and means for mounting said pendulum means on said ring.

10. A control device for the recording mechanism of weighing apparatus, said device embodying a fluid discharge passage, a body associated with said passage movable to and fro relative thereto and clear of the walls thereof, pendulum means carrying said body and adapted to allow said to-and-fro movement, said pendulum means being unconnected with the weighing mechanism, and means actuated in response to movement of the weighing movement of said mechanism for discharging fluid through said passage against said body to displace the pendulum means from its position in which the recording mechanism is operated, said pendulum means returning to its position to permit operation of the recording mechanism when the weighing apparatus attains equilibrium, the means which prevents operation of the recording mechanism on displacement of the pendulum means, and adapted to permit operation of the recording mechanism when the pendulum means returns, embodying a projection on the pendulum and a member on the recording mechanism, one of which is provided with a slot and the other with a portion to enter the slot when in registration therewith, said projection and said slot being movable into and out of registering relation.

WILHELMUS A. van BERKEL.

REFERENCES CITED

The following references are of record in the file of this patent:

FOREIGN PATENTS

| Number | Country | Date |
| --- | --- | --- |
| 459,212 | Great Britain | Sept. 28, 1935 |